United States Patent [19]

Yagi et al.

[11] Patent Number: 4,890,719
[45] Date of Patent: Jan. 2, 1990

[54] EXCAVATOR FOR BUCKET ELEVATOR TYPE CONTINUOUS UNLOADER

[75] Inventors: Yoshitaka Yage, Niihama; Toramasa Matsugi, Toyo; Mitsushige Kiyama, Niihama, all of Japan

[73] Assignee: Sumitomo Heavy Industries, Ltd., Tokyo, Japan

[21] Appl. No.: 121,509

[22] Filed: Nov. 13, 1987

[30] Foreign Application Priority Data

Dec. 20, 1985 [JP] Japan .................................. 60-195259

[51] Int. Cl.⁴ .............................................. B65G 43/00
[52] U.S. Cl. ..................................... 198/507; 198/509; 414/141.1; 414/917
[58] Field of Search ................. 198/507, 509; 414/139, 414/141.1, 142.5, 141.4, 917, 133

[56] References Cited

U.S. PATENT DOCUMENTS

| 3,734,564 | 5/1973 | McKay et al. | 198/507 X |
| 4,054,213 | 10/1977 | Chever | 198/507 X |
| 4,268,204 | 5/1981 | Stelfox et al. | 198/509 X |
| 4,440,537 | 4/1984 | Blättermann et al. | 198/509 X |
| 4,702,366 | 10/1987 | Zaccaron | 198/509 |

FOREIGN PATENT DOCUMENTS

| 3608116 | 5/1987 | Fed. Rep. of Germany | 198/509 |
| 46-3007 | 1/1971 | Japan | |
| 0027236 | 2/1987 | Japan | 198/507 |
| 0027237 | 2/1987 | Japan | 198/507 |
| 2189208 | 10/1987 | United Kingdom | 198/507 |

Primary Examiner—David A. Bucci
Assistant Examiner—D. Glenn Dayoan
Attorney, Agent, or Firm—Armstrong, Nikaido, Marmelstein, Kubovcik & Murray

[57] ABSTRACT

An excavator for a bucket elevator type continuous unloader has a horizontal travel section constituting an excavating section of the bucket elevator which is constituted by an endless bucket chain, and a parallel link mechanism. The parallel link mechanism is positioned below an elevator post which is moved up and down by a boom, and supports the horizontal travel section. The excavating section is moved sideways from just below the elevator post by swinging the parallel link mechanism so as to rake up bulk cargo such as ore and coal located deep inside the hold. The degree of movement of the excavation section in the vertical direction is detected by detecting the swing angle of the parallel link mechanism, by which the boom is automatically controlled so as to maintain the excavating section at the same level. In this way, fumbling of the excavated bulk cargo can be prevented.

1 Claim, 4 Drawing Sheets

4,890,719

EXCAVATOR FOR BUCKET ELEVATOR TYPE CONTINUOUS UNLOADER

BACKGROUND OF THE INVENTION

1. Field of the Invention

The present invention relates to an excavator for a bucket elevator type continuous unloader, which is used to efficiently unload bulk cargo from a ship. More specifically, the present invention is concerned with an excavator which is capable of efficiently raking up the bulk cargo such as ore and coal that are located deep inside the hold, using a bucket elevator.

2. Description of the Prior Art

The excavator of the above-described type is disclosed in the specification of Japanese Patent Publication No. 3007/71. In this excavator, the frame of a bucket conveyor suspended at the distal end of a boom is divided into a fixed upper frame and lower movable parallelogram links so as to make the excavating section swingable.

The above-described known excavator has a swingable excavating section. However, when the excavating section is swung, it is also moved up or down, causing collapse of cargo.

SUMMARY OF THE INVENTION

Accordingly, an object of this invention is to provide an excavator which enables excavation at the same horizontal level even if the excavating section is swung in a wide range to unload the hold, and which can prevent the cargo located near the wall of the hold from tumbling and is therefore safe.

To this end the present invention provides an excavator for a bucket elevator type continuous unloader which includes: a boom which is operated by a luffing cylinder; an elevator post suspended from the distal end of said boom; a shuttle frame supported by said elevator post; a horizontal frame for pivotally supporting sprockets at two ends thereof; a parallel link mechanism coupled at the upper end portion thereof to the shuttle frame by pivot pins and at the lower end portion to said horizontal frame; an actuator for swinging the parallel link mechanism about the upper pivot pins; and an endless bucket chain wound around the two sprockets and run in such a manner that it moves up along one side of the elevator post and that it lowers along the other end thereof, wherein the improvement is characterized by the inclusion of: an angle detector for detecting the swing angle of the parallel link mechanism; and a device for controlling the luffing cylinder in accordance with the detection signal of the angle detector.

DESCRIPTION OF THE PREFERRED EMBODIMENTS

Figure 1:
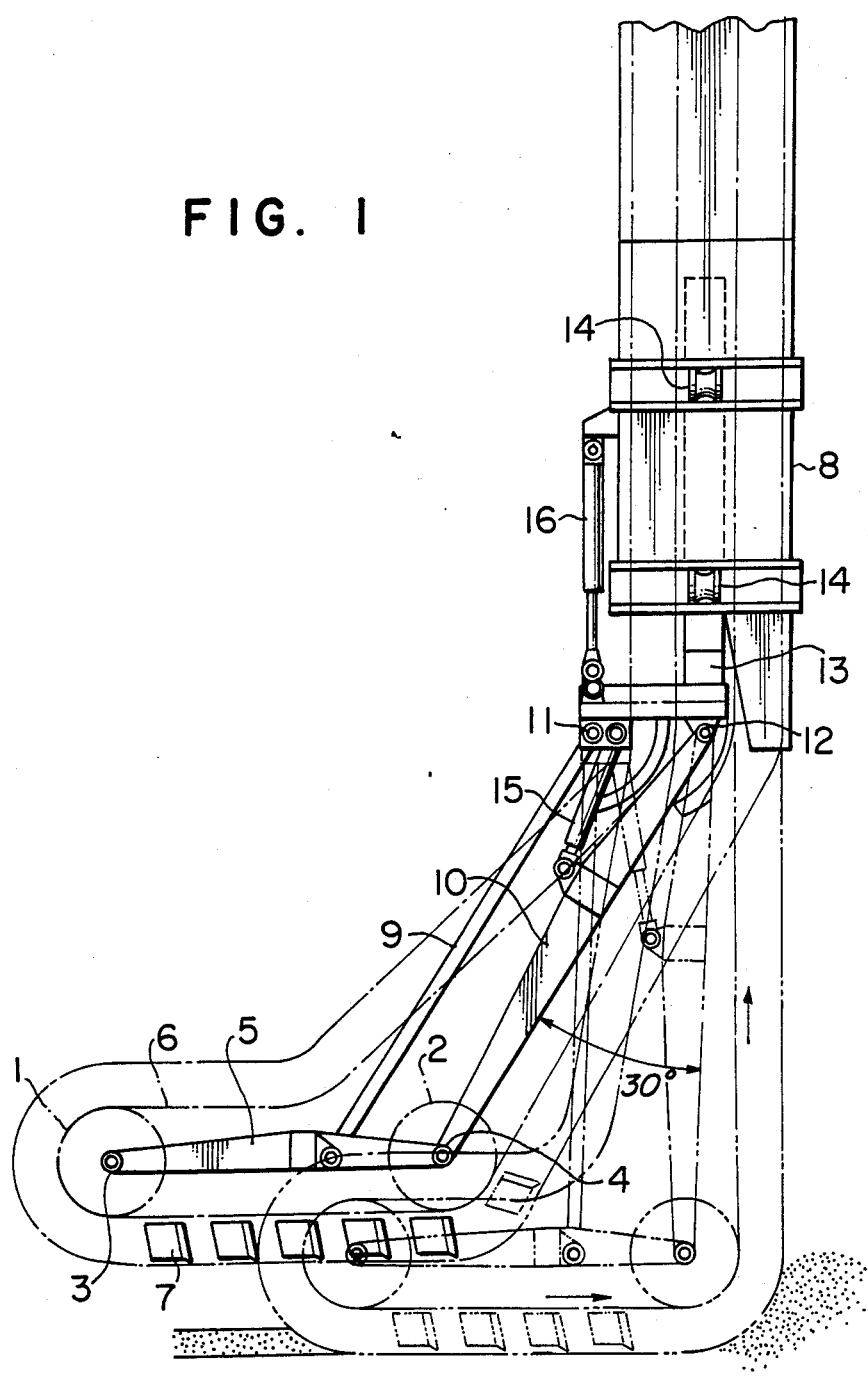
FIG. 1 shows an excavator according to the present invention.

Reference numerals 1 and 2 denote sprocket wheels which are provided at two sides of an excavating section. The sprocket wheels are rotatably supported about shafts 3 and 4, respectively, which are supported at two ends of a horizontal frame 5. Reference numeral 6 designates a chain to which buckets 7 are fixed at a fixed pitch. The chain 6 is driven in an endless manner by a driving sprocket wheel (not shown) provided at the upper portion of an elevator post 8.

The horizontal frame 5 is coupled by pins to the lower ends of links 9 and 10 which constitute two parallel sides of a parallel link mechanism. The other ends of the links 9 and 10 are coupled to a shuttle frame 13 by pins 11 and 12, respectively. The pin 12 is provided with an angle detector. The shuttle frame 13 is moved up and down by being guided by rollers 14 provided on the elevator post 8.

Figure 3:
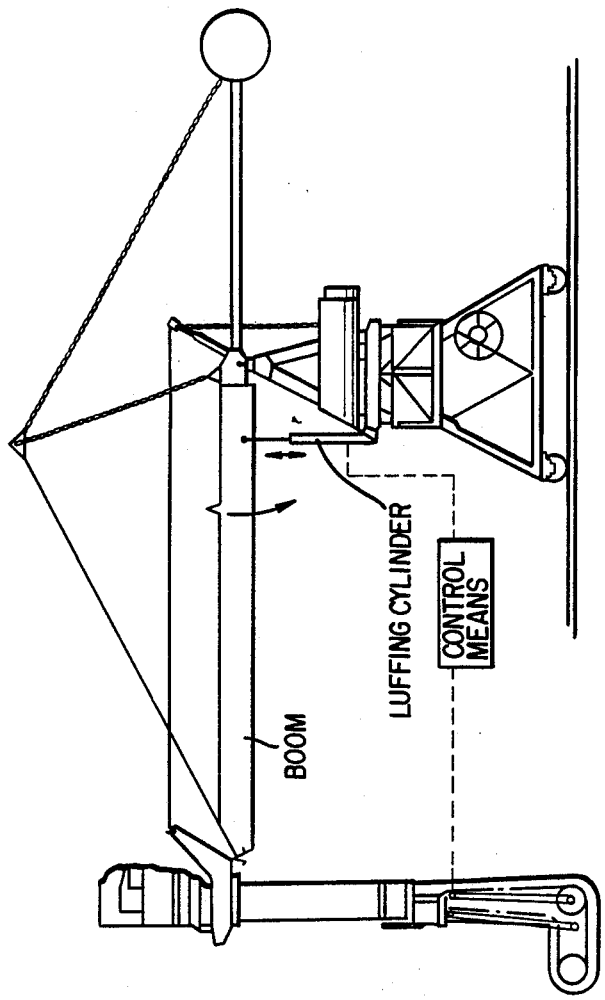
FIG. 3 shows the excavator mounted to a boom which is operated by a luffing cylinder.
Figure 4:
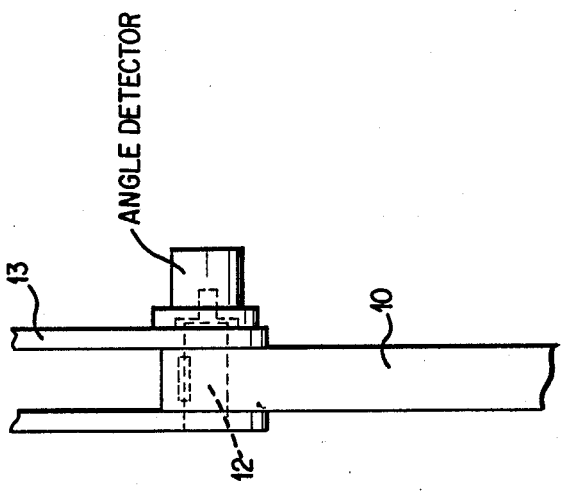
FIG. 4 shows a partial side view of the angle detector mounted on one of the pivot pins.

The horizontal frame 5 is moved parallel through the parallel link mechanism by actuating a hydraulic cylinder 15 connecting the link 10 and the shuttle frame 13. When the hydraulic cylinder 15 is operated, the links 9 and 10 pivot while the excavating surface moves up or down. However, the pivot angle of the link 10 is detected by the angle detector, and the detection signal is used to actuate a luffing cylinder (a) cylinder used to luff a boom that supports the entirety of the bucket elevator) (FIG. 3) by a hydraulic device, so that excavation is always, performed at the same level. The maximum swing angle is about 30 degrees at the rise of the bucket. Reference numeral 16 denotes an expansion cylinder which applies tension to the chain 6 to which a series of buckets are fixed. When impact is received in the vertical direction from the bottom, the expansion cylinder 16 detects an abnormal load, and is contracted.

Figure 2:
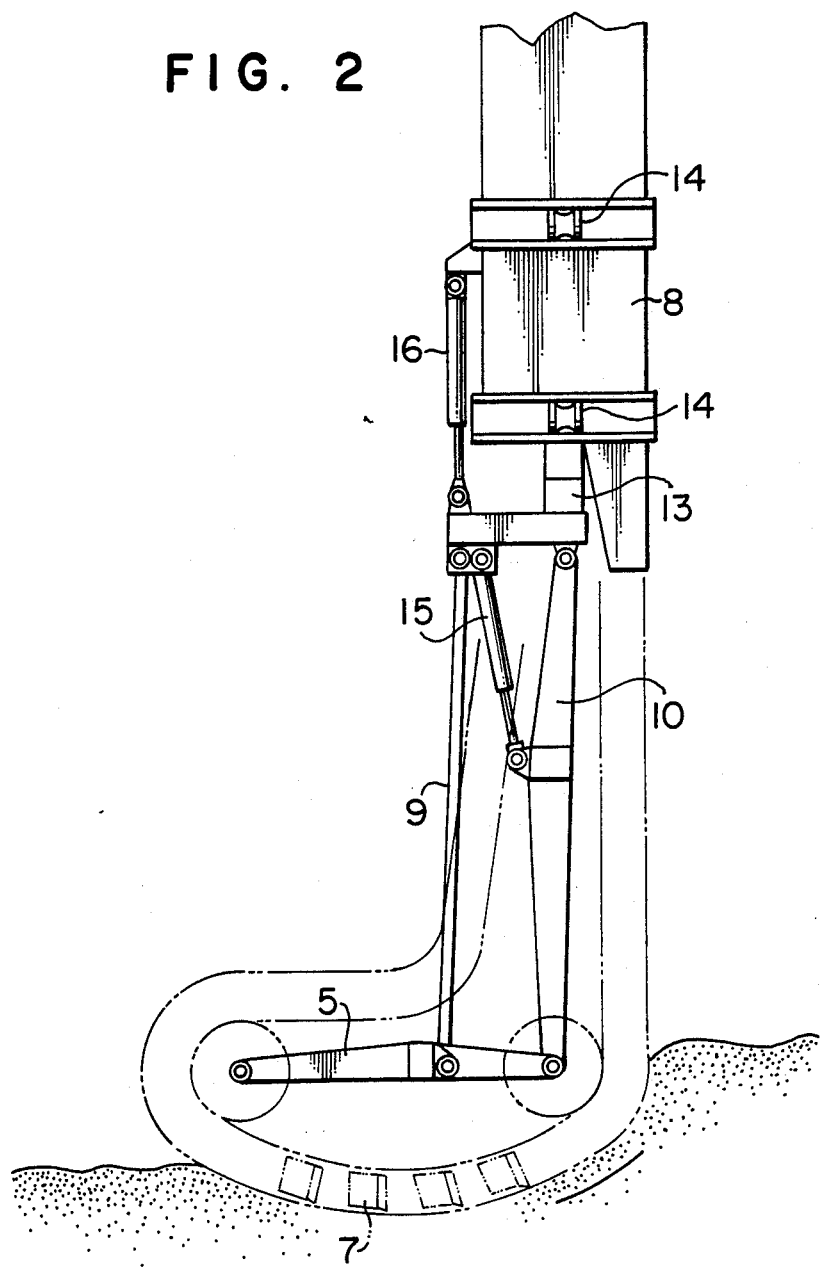
FIG. 2 shows the excavator wherein the excavator section is in the catenary state.

At a time when the cargo is discharged from the bottom at which there is a risk of the bucket elevator coming in contact with the bottom, the expansion cylinder 16 is contracted so as to raise the horizontal frame 5, by which the bucket elevator is set to a catenary state (see FIG. 2). In this way, the base cargo can be discharged while avoiding impact caused by the dipping and heaving of a ship.

When the hydraulic cylinder 15 is actuated, the parallel link mechanism is swung, by which the sprocket wheels 1 and 2 in the excavating section are moved parallel while the excavation surface is moved up or down. At this time, the swing angle of the parallel link mechanism is detected, and the detection signal is used to actuate the luffing cylinder which luffs the boom that supports the entirety of the bucket elevator, thereby maintaining the excavating surface at the same level.

In this invention, the excavating section can be swung by the parallel link mechanism, the excavating section being constituted by the chain which are wound around the sprocket wheels rotatably mounted at two ends of the horizontal frame and on which the buckets are fixed at a predetermined pitch, and the elevator post can be moved up and down by the luffing cylinder. As a result, the excavation surface can be maintained at the same level, and this ensures a safe operation.

What is claimed is:

1. A bucket elevator type continuous unloader comprising:
    a boom having a distal end;
    a luffing cylinder operatively connected to an moving said boom;
    an elevator post suspended from the distal end of said boom;
    a shuttle frame supported by said elevator post;
    a horizontal frame having opposite ends;

sprockets pivotally supported on said opposite ends of said horizontal ends;

a parallel link mechanism having an upper end portion and a lower end portion and being coupled to said shuttle frame at said upper end portion by pivot pins and to said horizontal frame at said lower end portion;

an actuator for swinging said parallel link mechanism about said upper pivot pins;

an endless bucket chain wound around said two sprockets and run in such a manner that said chain moves up along one side of said elevator post and that said chain lowers along the other end thereof;

an angle detector provided on one of the pivot pins for detecting the swing angle of said parallel link mechanism and producing a detection signal; and means for controlling said luffing cylinder in accordance with the detection signal of said angle detector so that said horizontal frame remains at a same level.

* * * * *

UNITED STATES PATENT AND TRADEMARK OFFICE
CERTIFICATE OF CORRECTION

PATENT NO. : 4,890,719
DATED : January 2, 1990
INVENTOR(S) : YAGI et al

It is certified that error appears in the above-identified patent and that said Letters Patent is hereby corrected as shown below:

On the cover page, Item [75], "Yoshitaka Yage" should read

--Yoshitaka Yagi--.

Signed and Sealed this

Nineteenth Day of March, 1991

Attest:

HARRY F. MANBECK, JR.

Attesting Officer

Commissioner of Patents and Trademarks